(12) United States Patent
Dande et al.

(10) Patent No.: US 8,819,492 B2
(45) Date of Patent: Aug. 26, 2014

(54) SYSTEM AND METHOD FOR TESTING AND ANALYSES OF THE COMPUTER APPLICATIONS

(75) Inventors: Madhu Dande, Ridgeland, MS (US); RameshKumar Perumal, Ridgeland, MS (US)

(73) Assignee: Tata Consultancy Services Limited, Maharashtra (IN)

( * ) Notice: Subject to any disclaimer, the term of this patent is extended or adjusted under 35 U.S.C. 154(b) by 137 days.

(21) Appl. No.: 13/325,249

(22) Filed: Dec. 14, 2011

(65) Prior Publication Data

US 2013/0117609 A1  May 9, 2013

Related U.S. Application Data

(60) Provisional application No. 61/555,085, filed on Nov. 3, 2011.

(51) Int. Cl.
*G06F 11/00* (2006.01)
*G06F 11/36* (2006.01)

(52) U.S. Cl.
CPC .................. *G06F 11/3692* (2013.01)
USPC .................. 714/33; 714/32; 714/25

(58) Field of Classification Search
USPC ............. 714/33, 25, 3, 37, 48, 47.13
See application file for complete search history.

(56) References Cited

U.S. PATENT DOCUMENTS

| | | |
|---|---|---|
| 7,165,189 B1 * | 1/2007 | Lakkapragada et al. ......... 714/31 |
| 7,810,070 B2 | 10/2010 | Nasuti et al. |
| 2004/0194064 A1 * | 9/2004 | Ranjan et al. .................. 717/124 |
| 2005/0204201 A1 | 9/2005 | Meenakshisundaram et al. |
| 2009/0013208 A1 * | 1/2009 | DiMuzio ............................ 714/2 |
| 2009/0249297 A1 | 10/2009 | Doshi et al. |
| 2010/0070805 A1 * | 3/2010 | Chang et al. ..................... 714/39 |
| 2011/0208785 A1 * | 8/2011 | Burke et al. .................. 707/803 |

* cited by examiner

*Primary Examiner* — Sarai Butler
(74) *Attorney, Agent, or Firm* — Hayes Soloway P.C.

(57) ABSTRACT

System and method for generating an enhanced test case for a computer application is disclosed. The system provides a test preparation engine including an entity extracting module and an assembly extractor for collecting information about the computer application and corresponding database schema for generating a global report. The test case designing module designs one or more test cases by using the global report. The test case execution engine includes an input evaluation module and generates an actual result for each executed test case and an expected result for one or more database query. The report generating module includes a result storage device, a result comparator and a result analysis module and performs analysis of the actual test case result and the expected results.

6 Claims, 3 Drawing Sheets

SYSTEM AND METHOD FOR TESTING AND ANALYSES OF THE COMPUTER APPLICATIONS

CROSS-REFERENCE TO RELATED APPLICATION

This application claims priority to copending U.S. Provisional Application entitled, "THE SYSTEM AND METHOD FOR TESTING AND ANALYSES OF THE COMPUTER APPLICATIONS," having Ser. No. 61/555,085 filed Nov. 3, 2011, which are entirely incorporated herein by reference.

BACKGROUND OF THE INVENTION

1. Field of the Invention

This invention generally relates to the field of testing software applications. More particularly, the invention relates to the field of automated software testing for identifying business functions, processing test cases and generating reports based on analyses results of the software application 2. Discussion of the Related Art Nowadays, almost every organization is dependent on computer applications for effective working of their business. The development of computer applications is a continuous process in order to meet the requirement of business organizations. Hence, before deploying any computer application in an organization, it should be tested thoroughly to avoid any malfunctioning. Due to this, the software vendors are compelled to meet the quality standard in a faster and efficient manner.

In testing industry, an investigation is conducted to provide stakeholders with information about the quality of product or service under test. A general norm and practice is to validate and verify that a software program, application or product can be implemented with the same characteristics as expected and testers are adapted particularly The process of software testing is broadly divided into two different categories, manual testing and automated testing. The manual testing is a testing where the entire test cases are designed and executed by manual testers whereas in the automated testing the testing is carried out with the help of an automated process. Currently, there are many testing automation solutions available that address and claim to ease-up problems associated with software testing. However, software testing is majorly carried out with the help of manual testing. Amongst others, tools like QTP, WIN runner, and test director are widely used for testing and quality management of software.

The process of manual testing is a very time consuming and tedious process, especially for bulky applications. Due to time restrictions and manual errors involved in manual testing, developers have started to develop automation testing tools in order to enhance the process of software testing. But due to the variety in the underlying application platform the whole process of software testing cannot be fully automated. For the development of each test case the programming knowledge is required and the underlying classes and functions are also needed in the system. Moreover, in current trend, most of the software products are developed using Agile methodology. So after each sprint, testers need to perform regression testing in addition to the unit testing of the current sprint changes. It takes a longer time to complete when only manual testing is done.

In the conventional system and methods providing unit level testing, each function is to be tested by creating the wrapper script which is a time consuming process. However, all these system and methods fetches the database columns and tables for comparing them with the older sprint. But they remain silent on automatic analysis report generation and comparison technique which may help the tester at the time of designing a test case and later its analysis.

Therefore there is a need to develop a test automation system capable of helping the manual testers in designing test cases by generating analysis results. Also, there is a need of such a system which is capable of automating the test execution process for reducing the overall complexity of the testing system.

SUMMARY OF THE INVENTION

The present invention provides a system for generating an enhanced test case for a computer application. The system comprises of a test preparation engine for collecting information about the computer application and corresponding database schema. The test preparation engine further comprises of an entity extracting module and an assembly extractor. The system further comprises of a test case designing module and a test case execution engine. The test case execution engine generates an actual result for each executed test case and an expected result for one or more database query. The test case execution engine further comprises of an input evaluation module. The system further comprises of a report generating module performing analyses of the actual test case result. The report generating module comprises of a result storage device, a result comparator and a result analyses module.

The present invention also provides a method for generating an enhanced test case for a computer application. The method comprises of processing the computer application in order to collect information about the computer application and corresponding database schema, identifying variation between the database schema information and its respective developed code and capturing and analyzing metadata of the computer application for generating a global report. The method further comprises of generating one or more test cases by using the global report, generating an expected result for one or more database query corresponding to each test case, executing the test case and generating an actual result for each of the test case and comparing the actual result with the expected result for analyzing a difference and generating an analyses report for the said difference.

The present invention also provides a computer programme product for generating an enhanced test case for a computer application. The computer programme product comprises of a test preparation engine for collecting information about the computer application and corresponding database schema. The test preparation engine comprises of an entity extracting module and an assembly extractor. The computer programme product further comprises of a test case designing module for designing one or more test cases and a test case execution engine. The test case execution engine further comprises of an input evaluation module and a report generating module. The report generating module further comprises of a result storage device, a result comparator and a result analyses module.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the invention, which may be embodied in various forms.

A system and method for testing a computer application and generating one or more reports for designing one or more enhanced test cases is disclosed.

Figure 1:
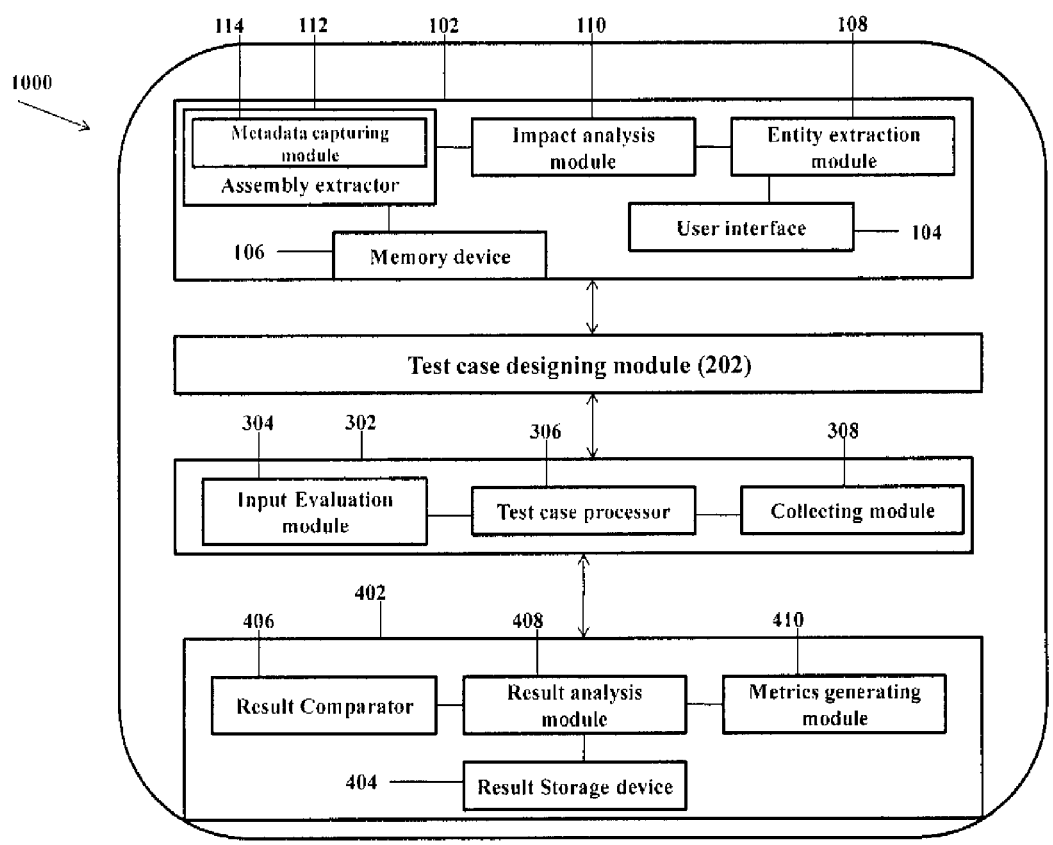
FIG. 1 illustrates the system architecture of the invention in accordance with an embodiment of the invention.

In accordance with an embodiment of the invention, FIG. 1 shows a system (1000) for generating an enhanced test case by processing information about the computer application and corresponding database schema. The system (1000) is constructed using one or more modules functioning independently or in combination for performing the testing of the software application and generating an enhanced test case.

The system (1000) comprises of a test preparation engine (102) configured for collecting one or more information about the software application. The test preparation engine (102) includes a user interface (104) and one or more memory device (106). The test preparation engine (102) further comprises of an entity extraction module (108), an impact analyses module (110) and an assembly extractor.

Figure 2:
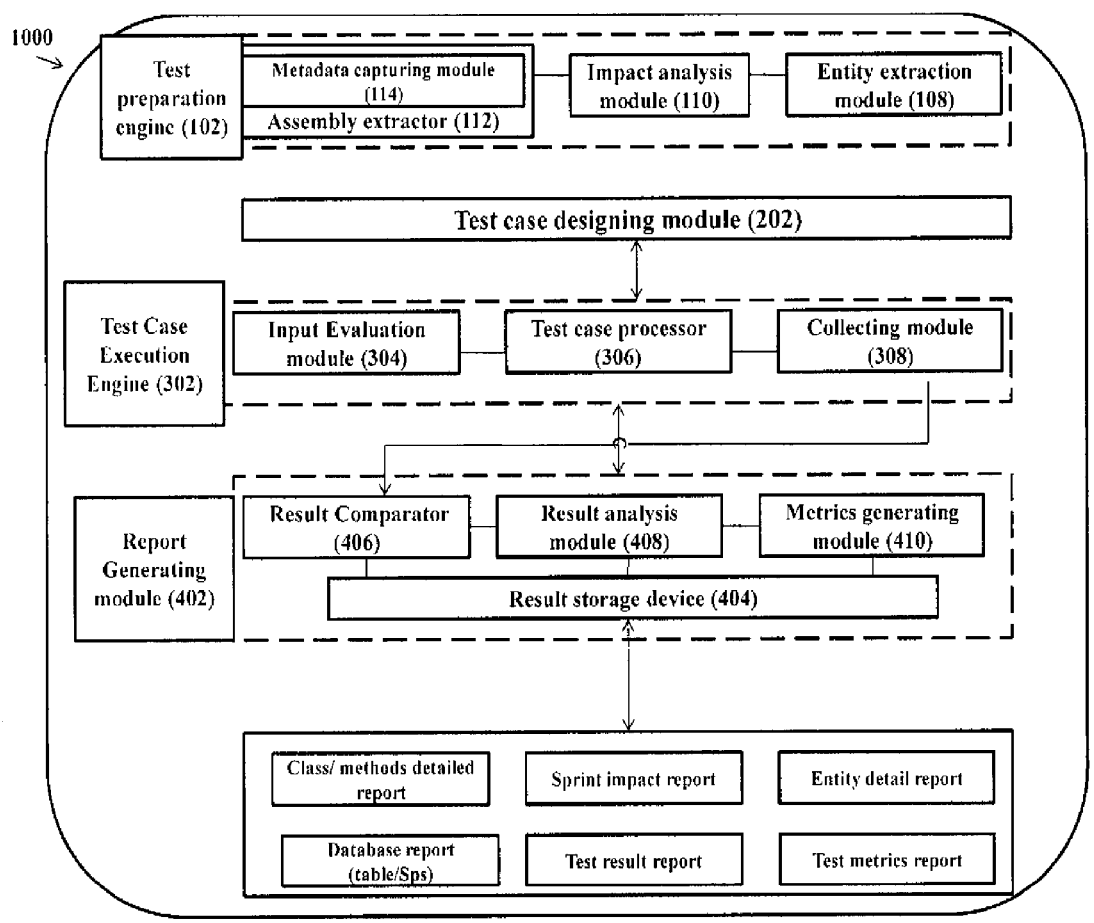
FIG. 2 illustrates the distribution of system components in accordance with an alternate embodiment of the invention.

Referring to FIG. 1 and FIG. 2 in combination, a developer prepares a software application to be tested by a tester by designing one or more test case. By means of the user interface (104) of the test preparation engine (102) the developer provides an input to the test preparation engine (102). The test preparation engine (102) collects one or more information about the software application to be tested by using its one or more modules. The test preparation engine also captures information about corresponding database schema. The information collected by the test preparation engine (102) is stored in the memory device (106).

Figure 3:
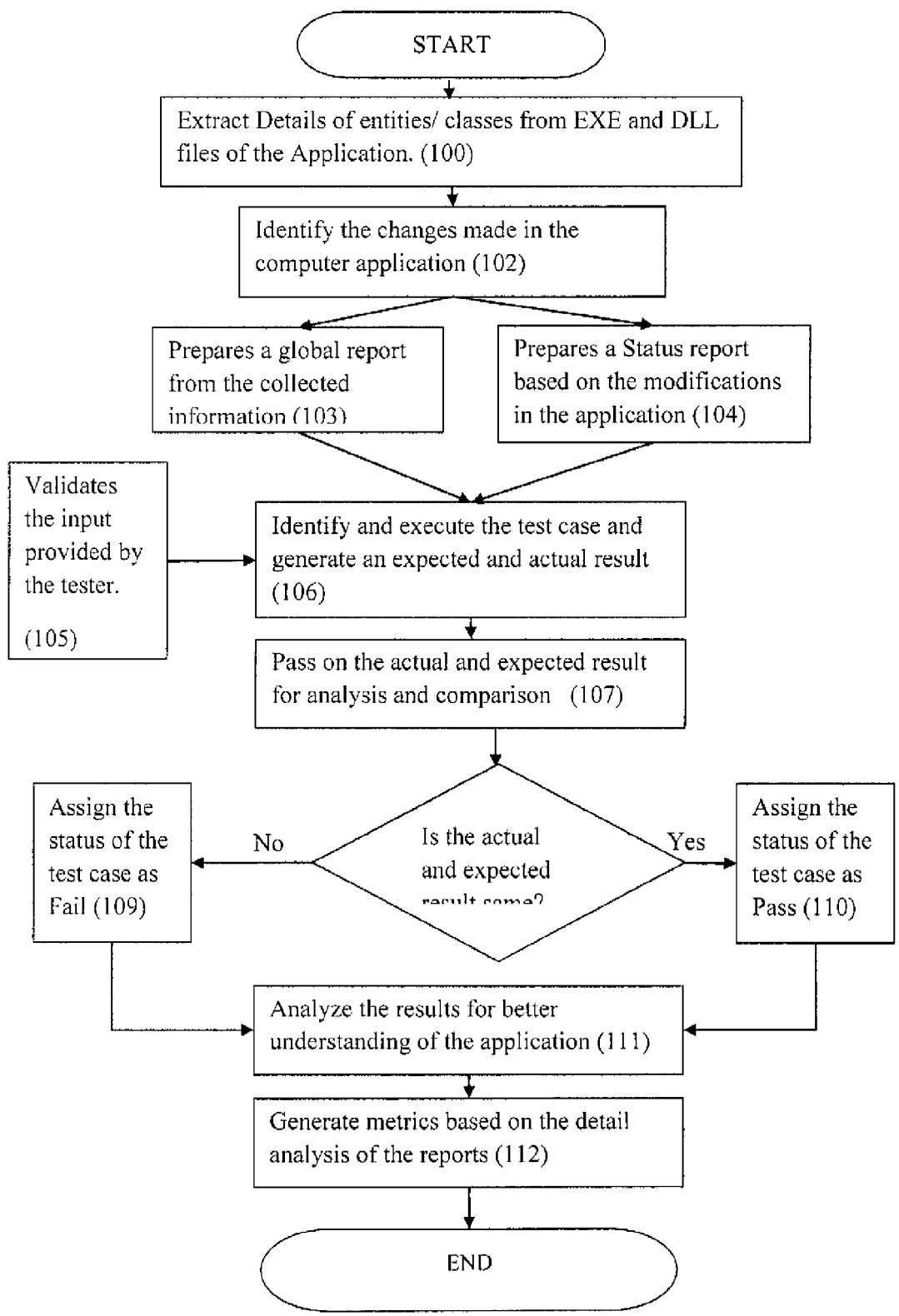
FIG. 3 illustrates an exemplary flowchart of an alternate embodiment of the invention.

In accordance with an embodiment, as shown in step (100) of FIG. 3, the test preparation engine (102) collects the one or more information by using its one or more module by using a Dynamic Link Library (DLL) and other executable files of the computer application prepared by the developer.

The entity extracting module (108) of the test preparation engine (102) is configured to extract the details of an entity and/or class by extracting the metadata of the application to be tested. The entity extracting module (108) will also extract user-defined objects in a code base and also its corresponding information from the database schema. This will help in identifying any differences between the database schema information and its respective developed code. The entity extracting module (108) also handles the mapping of a stored procedure variable to avoid any runtime error due to mismatches of number of parameters or data types of those parameters being passed to execute stored procedure, identifying differences in the database table field versus user defined properties of a corresponding object in code for primary key validator, regular expression validator, not-null validator, acceptable length validator etc.

The entity and/or class extracted by the entity extracting module (108) are further transmitted to the impact analysis module (110). Referring to FIG. 3, as shown in step (102), the impact analysis module (110) is configured for the analysis of a sprint present in the application to be tested. The sprint is a basic unit of development in a scrum or agile development methodology. The impact analysis module (110) also identifies the changes related to the database schema for example schema changes, user defined functions and other table or variable constraints. The impact analysis module (110) is adapted to generate a status report for each of the existing functionality removed or added from the computer application to be tested and existing functionality modified in the computer application to be tested as shown in step (104) of FIG. 3.

The status report provides the following information:
Any new class added or modification in any existing class or deletion of any existing class.
Any new function added or modification in any existing function or deletion of any existing function.
Any modification in signature which may include and is not limited to number of arguments, parameters type or return type.
Any addition, deletion or modification in a user defined entity and its properties.

The status report is further stored in the memory device (106) and is accessible to the developer for signing-off the changes made during last sprint. By using the status report the tester may design a new case or modify an existing case.

The test preparation engine (102) further comprises of the assembly extractor (112) which includes a metadata capturing module (114) which collects information from the metadata of assembly or DLL files. The information may be on business logics or application functionalities. The metadata includes and is not limited to assembly or executable version, class name, method name, signature of each method (return type, number of parameters, and types of parameters). The assembly extractor (112) extracts a dot net metadata for generating the global report of the application to be tested This metadata is provided as an input for generating a global report to be used by the tester for designing one or more test cases for testing the computer application as shown in step (103) of FIG. 3.

The global report provides the following information:
Assembly or executable version
Class name Method name Signature of each method (return type, number of parameters, type of each parameters)

Properties of user defined objects

Database schema details

The global reports thus generated can also be used by the tester for designing a new test case or for modifying an existing test case which will minimize the work to be carried out by the tester in preparing the test case for testing the software application. Also, by using this global report, the tester can prepare an expected result which help in comparing an actual test result of the software application for testing the functionalities of the software application.

The assembly extractor (112) also detects and identifies one or more differences between the database schema and source-code in a computer application for primary key validator, regular expression validator, not-null validator, acceptable length validator etc. This identification will ensure the accuracy of the data stored as well as it increases the understanding level of the computer application.

In addition to this, the assembly extractor (112) also captures other information like operational parameters, property valuators and their parameters. All this information is analyzed for determining the order of functions while executing the test cases.

The system further comprises of a test case designing module (202) adapted to design on or more test cases for the computer application. The tester will use the global report and the status report for designing one or more test case for the computer application to be tested.

In accordance with an embodiment, again referring to FIG. 1 and FIG. 2 in combination, the system (1000) further comprises of a test case execution engine (302). The test case execution engine (302) is the core component of the system (1000). The test case execution engine (302) is adapted to process the one or more test cases designed by the tester. The tester provides one or more inputs of the test case to be tested to the test case execution engine (302).

Referring to FIG. 3, as shown in step (105), the test case execution engine (302) further comprises of an input evaluation module (304) configured to validate and verify the accuracy of the input parameters before executing the test case. The input evaluation module (304) also validates optional parameters for which the value may not be provided by the tester, and it also executes the same.

The test case execution engine (302) further comprises of a test case processor (306) for processing the test case designed by the tester. The test case processor (306) processes the one or more test case by using one or more functionality or class of one or more software development tool. The input parameters of the test case are provided to the function or class of the software development tool used by the test case processor (306) for generating one or more actual result.

As shown in step (106) of FIG. 3, the tester may provide a database query to the test case processor (306) for generating one or more expected result with respect to the one or more test case designed by the tester. These expected results will be further used for analyses of the designed test case by performing a comparison with the actual results.

The test case processor (306) further identifies the method and/or function to be executed by using the functionality or class of the software development tool. The output generated by the test case processor (306) is collected by the collecting module (308) for further analysis of the test case. The generated actual result and expected results are also stored in the collecting module (308).

The test case processor (306) of the test case execution engine (302) processes the input of the test case provided by the tester by using the reflection concept of the dot net software development tool.

In accordance with an embodiment, still referring to FIG. 1 and FIG. 2 in combination, the system (1000) further comprises of a report generating module (402) for generating the one or more report related to the analysis of the test case.

The report generating module (402) further comprises of a result storage device (404) for storing one or more expected results generated by the test case processor (306). The result storage device (404) may also store expected results provided by the tester which are determined manually.

Referring to FIG. 3, as shown in step (108), the report generating module (402) further comprises of a result comparator (406) for comparing the actual results generated by the one or more components of the test case execution engine (302) with the expected results provided by the tester manually or with expected results generated by the test case processor (306).

As shown in step (111) of FIG. 3, the report generating module (302) further comprises of the result analysis module (408) for analyzing the results provided by the result comparator (406) and further generating a detailed report for each of the test case. This report will be used by the tester for finding out one or more problems present in the application under test.

The report generating module (402) of the system (1000) generates one or more report including and is not limited to a class or method detail report, a sprint impact report, an entity detail report, a database report in the form of a table or any other alternate means, a test result report, a test metrics report or a combination thereof.

As shown in step (112) of FIG. 3, the report generating module (402) further comprises of a metrics generating module (410) for generating a metrics in the form of data obtained after the analysis of the test case is performed. As shown in step (109) and (110), the metrics generating module (410) generates a data related to the test case which includes and is not limited to total number of test cases, total number of test cases with an execution flag set as "Yes", total number of test cases with an execution flag set as "No", number of test cases passed successfully, number of test cases failed, performance metrics, test case execution processing time (in seconds) and result comparison processing time (in seconds). The number of test cases failed further includes and is not limited to test cases with an invalid or missing input, number of test cases with problem in method execution, number of test cases with results not matching or a combination thereof.

The below table illustrates the working example of the said application.

|  | Executed | Passed | Failed | In-Progress | Not Executed |
|---|---|---|---|---|---|
| Number of Classes | 64 | | | | |
| Number of Methods test data not created | 191 | | | | |
| Number of Methods test data created | = 678 − 191 | | | | |

-continued

|  | Executed | Passed | Failed | In-Progress | Not Executed |
|---|---|---|---|---|---|
| Number of Test cases | 1563 | 1556 | 1378 | 12 | 166 | 7 |
| Execution percentage (% of Number of test cases executed/number of test cases created) | 99.55% | | | | |
| Completion Percentage (% of Number of test cases passed/Number of test cases executed) | 88.56% | | | | |

Test case will be moved to Executed, Passed, Failed, In-Progress, Not Executed state based on the following conditions:
Executed: If Execution flag is set to "YES" and the test case processed or executed successfully
Not Executed: If Execution flag is set to "No" and the test case was not processed.
Passed: If Execution flag is set to "YES" and the test case Processed or Executed successfully and the results matched with the expected result provided by tester.
Failed: Case-1: If Execution flag is set to "YES" and the test case was not processed or executed successfully.
Case-2: If Execution flag is set to "YES" and the test case was Processed or Executed successfully and the results not matched with the expected result provided by tester.
In-Progress: Case-1: If tester has not provided the expected result for that specific test case.
Case-2: Testers don't have access to the certain data bases to execute.
Case-3: Test case with invalid or missing input test data.

For instance let us consider the second test cycle of an application (App 1) with 64 classes and 191 number of method. Let the number of test cases be 1563. Now after execution of the test cases the result generated revealed that 1556 test cases were executed out of which 1378 passed, 12 failed, 166 were in-progress and 7 were not executed. This leads us to the conclusion that 88.56 percent of the test cases were completed. The performance metrics generated by the system depict that the total test case execution processing time is 1307.673 sec and the result comparison processing time is 210.585 sec.

The above working example clearly shows the improvement achieved over the prior arts with respect to the execution time.

We claim:

1. A system for testing a computer application, the system comprising:
a test preparation engine comprising hardware configured to:
extract metadata of Dynamic Link Library (DLL) files or assemblies associated with the computer application;
extract an entity/class from the metadata; extract database schema of the computer application; extract code base of the computer application; identify a variation between the database schema and the code base; generate a status report comprising information related to a functionality added in the computer application, a functionality removed from the computer application, and a functionality modified in the computer application based upon the variation between the database schema and the code base; generate a global report associated with the computer application based upon the metadata;
a test case designing module configured to design one or more test cases for the computer application based upon the status report and the global report;
a test case execution module configured to:
execute the one or more test cases on the computer application; and
generate an actual result and an expected result based upon the execution of the one or more test cases; and
a report generating module configured to compare the actual result and the expected result in order to generate an analysis report comprising a difference between the actual result and the expected result.

2. The system of claim 1, wherein the report generating module further comprises a metrics generating module to generate a metrics, wherein data of the metrics comprises at least one of: a total number of test cases; a total number of cases with an execution flag set as 'yes'; a total number of cases with an execution flag set as 'no'; a number of test cases passed successfully; a number of test cases failed; a performance metrics; a test case execution time; and a result comparison processing time.

3. The system of claim 2, wherein the number of test cases failed comprises at least one of: a test case with an invalid or missing input; a test case with an error in method execution; and a test case with results not matching.

4. The system of claim 1, wherein the metadata comprises information related to a class name, a method name, signature of each method, properties of user defined objects, and database schema details.

5. A method for testing a computer application, the system comprising:
extracting metadata of Dynamic Link Library (DLL) files or assemblies associated with the computer application;
extracting an entity/class from the metadata;
extracting database schema of the computer application;
extracting code base of the computer application;
identifying a variation between the database schema and the code base;
generating a status report comprising information related to a functionality added in the computer application, a functionality removed from the computer application, and a functionality modified in the computer application based upon the variation between the database schema and the code base;
generating a global report associated with the computer application based upon the metadata;
designing one or more test cases for the computer application based upon the status report and the global report;
executing the one or more test cases on the computer application;
generating an actual result and an expected result based upon the execution of the one or more test cases; and
comparing the actual result and the expected result in order to generate an analysis report comprising a difference between the actual result and the expected result.

6. A computer program product having a processor and a non-transitory, machine-readable storage medium for testing a computer application, the computer program product comprising:
program code for:

extracting metadata of Dynamic Link Library (DLL) files or assemblies associated with the computer application;
extracting an entity/class from the metadata;
extracting database schema of the computer application;
extracting code base of the computer application;
identifying a variation between the database schema and the code base;
generating a status report comprising information related to a functionality added in the computer application, a functionality removed from the computer application, and a functionality modified in the computer application based upon the variation between the database schema and the code base;
generating a global report associated with the computer application based upon the metadata;
designing one or more test cases for the computer application based upon the status report and the global report;
executing the one or more test cases on the computer application;
generating an actual result and an expected result based upon the execution of the one or more test cases; and
comparing the actual result and the expected result in order to generate an analysis report comprising a difference between the actual result and the expected result.

* * * * *